Peter J. Wiezevich Inventor

Patented May 25, 1937

2,081,189

UNITED STATES PATENT OFFICE 2,081,189

DEHYDRATING ALCOHOLS

Peter J. Wiezevich, Elizabeth, N. J., assignor to Standard Oil Development Company, a corporation of Delaware Application December 28, 1935, Serial No. 56,425

3 Claims. (Cl. 202—68)

This invention relates to improved processes for the drying of liquids such as alcohols, esters, etc., and it relates more particularly to the countercurrent dehydration of the liquids in vapor form by means of a saturated aqueous solution of pearlash (potassium carbonate).

Many different schemes have been proposed in the past for drying vapors of liquids such as ethyl alcohol, isopropyl alcohol, etc., by means of normally solid materials which are capable of extracting water or water vapor from liquids or vapors containing same but there are numerous difficulties involved in the handling of a deliquescent solid material either in stick form or in granular form or the troubles due to incrustation of crystallizing solids on a heated surface or difficulties in regeneration of the drying agent for re-use and such regeneration is necessary from a commercial point of view. For instance, caustic soda in solid form has been found suitable for dehydration of ethyl and isopropyl alcohols but it is impractical to regenerate the resulting aqueous caustic soda solution and consequently such a dehydration process can be used commercially only when the resultant aqueous caustic soda can be put to use in some other process in the same plant or in some plant located nearby.

The present invention overcomes the difficulties of the prior art and provides a simple, economic, continuous and cyclic process which will have many practical applications as will be apparent to those skilled in the art from the reading of the following description as applied to the dehydration of isopropyl alcohol and of esters, for the sake of illustration only.

In all figures like numerals refer to like parts of apparatus.

Figure 1:
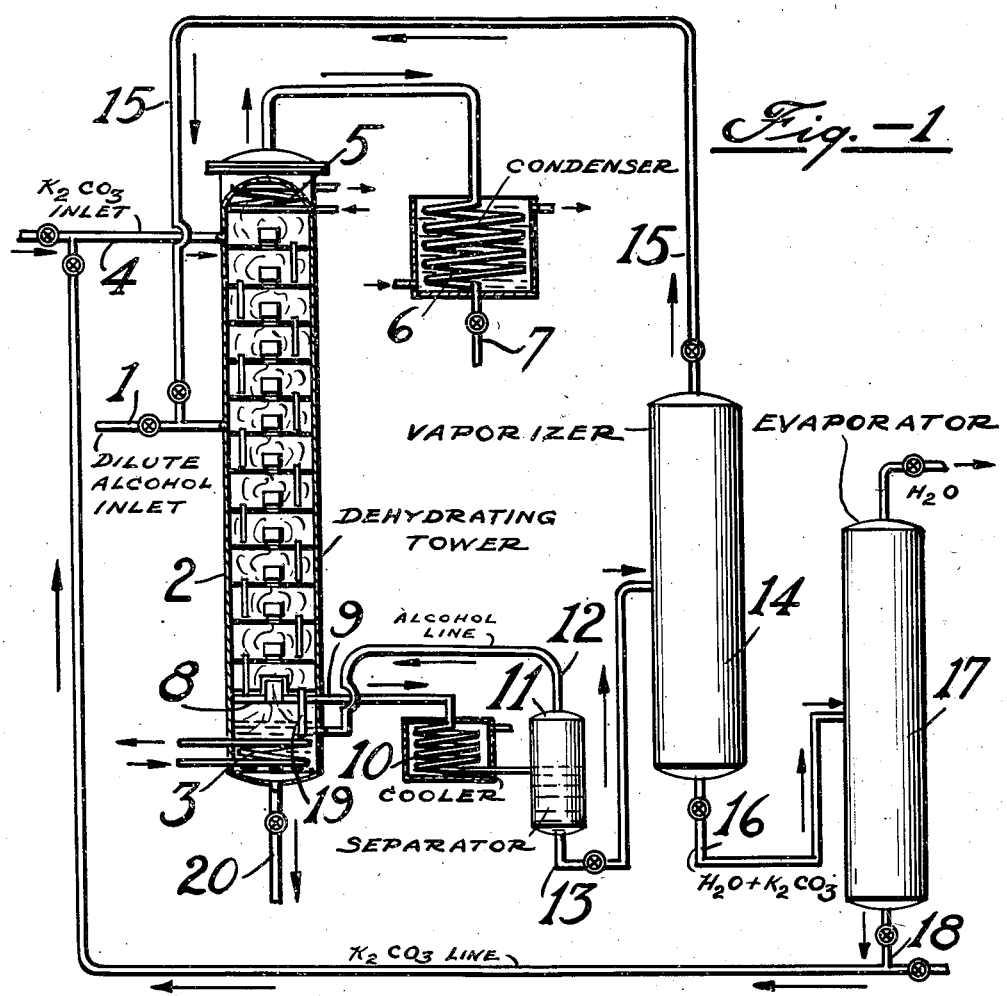
Fig. 1 shows a schematic layout of suitable apparatus for the dehydration of dilute alcohols, particularly isopropyl alcohol, although with some modifications it may also be used for ethyl alcohol.

Referring to Fig. 1, the dilute alcohol feed enters through pipe 1 into dehydrating tower 2 equipped with plates and bubble caps heated by the coil 3 to cause the alcoholic vapors to rise countercurrent to a descending stream of aqueous saturated solution of potassium carbonate fed in through line 4. The temperature at the top of column 2 should not exceed the temperature at which a saturated aqueous solution of pearlash has a vapor pressure of 0.1% or about 10 mm. under atmospheric pressure, 88° C. having been found to be the suitable maximum temperature. A suitable operating temperature is 82.8–83° C. If the temperature at the top of the column tends to exceed the desired limit it may be cooled by any suitable means such as cooling coil 5. The vapors leaving tower 2 at the top are about 99.9% alcohol and are liquefied in condenser 6 and withdrawn through outlet pipe 7. Ordinarily, the most concentrated isopropyl alcohol which may be obtained by rectification is the constant boiling mixture having 12.1% water and boiling at 80.4° C. By the present process, practically pure isopropanol boiling at about 82.8° C. may be drawn off the top of the tower. The temperature at the base of the column 2 should be maintained between the approximate limits of 100° and 115° C. and preferably between 102° and 110° C.

The descending stream of aqueous saturated solution of pearlash becomes diluted with the water extracted from the alcoholic vapors and finally is drawn off from the bottom plate 8 of the column 2 through line 9 where it is cooled in coil 10 and passed into separator 11 from which the upper layer of alcohol returns through line 12 into the bottom of tower 2 while the lower layer of aqueous solution of pearlash, containing some dissolved alcohol, is withdrawn through line 13 into vaporizer 14 which removes the alcoholic vapors in the form of a constant boiling mixture of alcoholic water, which vapors are then lead through line 15 back into the dehydrating column 2 while the alcohol-free aqueous solution of pearlash passes through line 16 into evaporator 17 where it is concentrated to form a saturated solution which is then withdrawn through line 18 and recycled through line 4 into the top of the dehydrating column 2.

Figure 3:
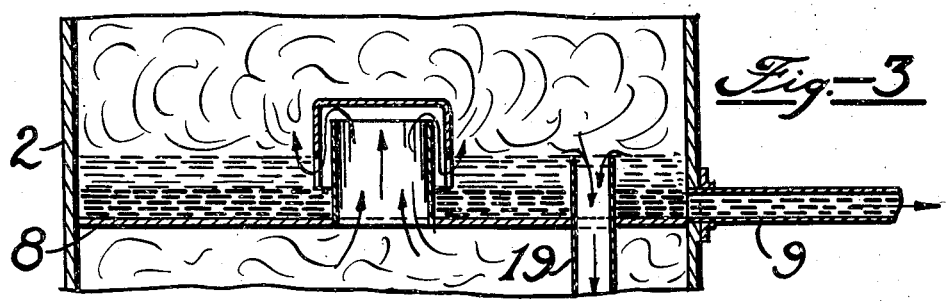
Fig. 3 shows a detail of the bottom plate of the dehydrating tower in Fig. 1 although it could likewise be used as the pearlash solution draw-off plate in the dehydrating tower in Fig. 2.

The bottom plate 8 of the dehydrating column 2 is equipped with a suitable overflow pipe 19 (shown in Fig. 3) so as to permit any higher boiling organic liquids, such as higher alcohols or other heavy ends which are insoluble in the aqueous pearlash solution and which form a supernatant layer over said pearlash solution, to descend into the bottom of the dehydrating column 2 from which they may be withdrawn through line 20 either in small amounts continuously or at irregular intervals when desired.

Vacuum may be used and pressure in some cases, if desired.

It is thus apparent that the invention as illustrated in Fig. 1 may be used advantageously for separating mixtures of light and heavy alcohols while simultaneously drying both of them.

Figure 2:
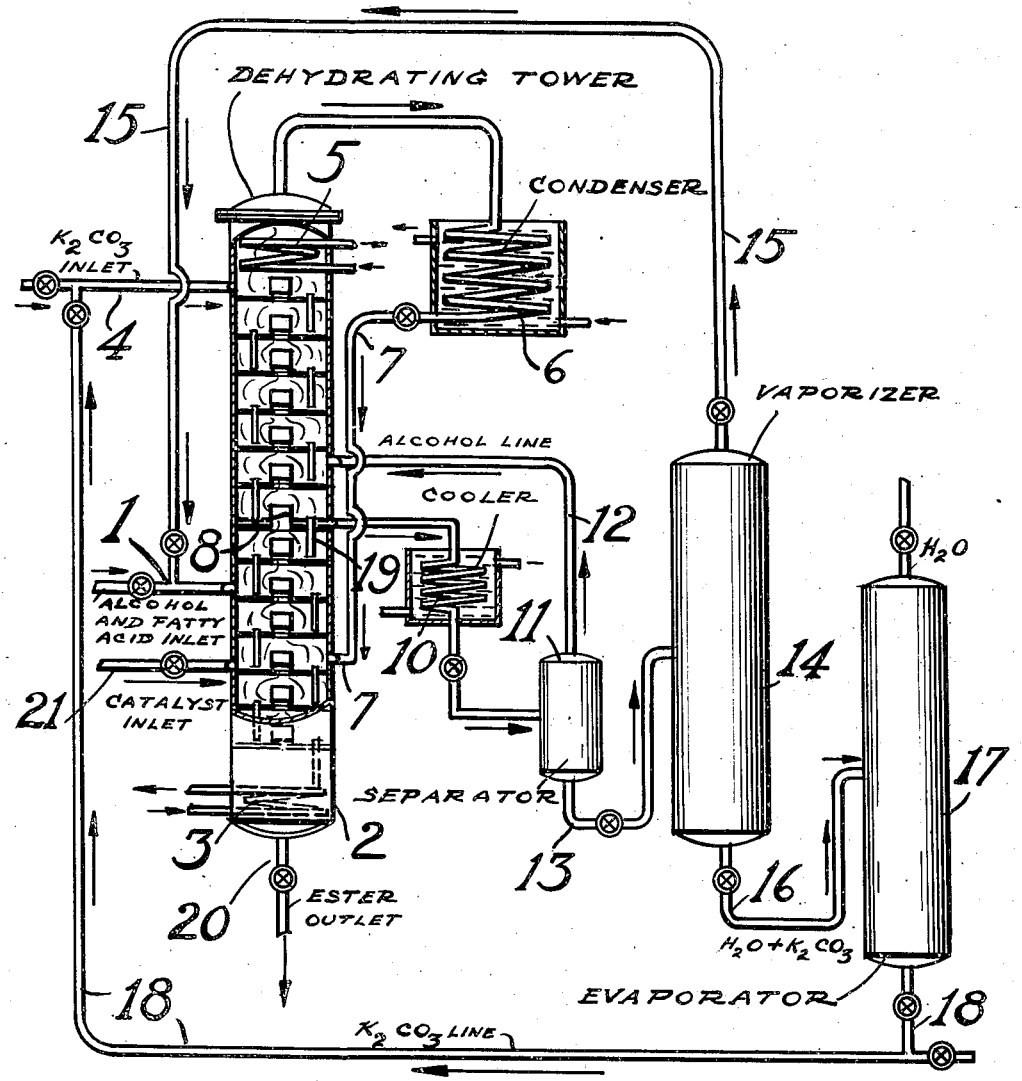
Fig. 2 shows a similar schematic layout as applied to the dehydration of a mixed alcohol-acid feed for the production of esters.

Referring to Fig. 2, a suitable ester-forming feed liquid such as a mixture of alcohol and fatty acid, for example, isopropyl alcohol and acetic acid, or preferably substantially non-volatile acids such as phosphoric or boric acids, or mixed acids obtained from the oxidation of paraffin wax, or even an aromatic acid such as benzoic or phthalic acid (these are solids and can be introduced in solution in the alcohol), is fed in through line 1 into dehydrating column 2 where the temperature is suitably adjusted at the bottom of the column by means of coil 3 to permit the higher boiling acid to descend in liquid form while the alcohol and water are vaporized and ascend the column in countercurrent to a descending stream of saturated aqueous pearlash solution fed in through line 4 at the top of the column. Substantially anhydrous vapors of alcohol are discharged from the top of the column and are liquefied in condenser 6 and passed through line 7 back into the column 2 at a point below the feed inlet 1 where the alcohol then combines with the organic acid to form an ester and is withdrawn through the discharge pipe 20. The descending stream of aqueous saturated pearlash solution becomes diluted with water extracted from the dilute alcoholic vapors and is withdrawn from plate 8 located slightly above the level of the feed inlet pipe 1. The pearlash solution is passed through cooler 10 into separator 11 from which the upper alcoholic layer is passed through line 12 back into dehydrating column 2 at a point above the feed inlet 1 while the lower aqueous pearlash solution is treated and recycled, the same as shown in Fig. 1.

For the manufacture of esters, a suitable catalyst may be fed in through line 21, if desired, or one may have 0.1% of sulfuric acid or other catalyst present in the still body out of contact with the pearlash.

Although a saturated aqueous solution of pearlash has been used in the above description of the invention and is to be preferred, the invention is also considered to include the use of an aqueous slurry containing finely divided suspended particles of pearlash.

It is obvious that certain variations can be made in this equipment and in the described processes and it is not intended that the invention be limited to the specific examples and apparatus described as illustrative only, but in the appended claims it is intended to claim all novelty inherent in the invention as broadly as the prior art permits.

I claim:

1. The method of dehydrating lower aliphatic alcohols miscible with water which comprises vaporizing same and contacting the vapors with a countercurrent stream of saturated aqueous solution of pearlash and condensing the dehydrated alcoholic vapors.

2. Method according to claim 1 carried out in a vessel equipped to prevent accumulation of pearlash therein.

3. The method of dehydrating a dilute isopropyl alcohol which comprises vaporizes same and contacting the vapors with a saturated aqueous pearlash solution in a vessel in which the temperature at the point where the dehydrated alcoholic vapors are withdrawn is not permitted to exceed the upper limit of about 88° C. at atmospheric pressure.

PETER J. WIEZEVICH.